C. W. & W. W. MARSH.
RAKING DEVICE FOR HARVESTERS.
No. 41,080. Patented Jan. 5, 1864.
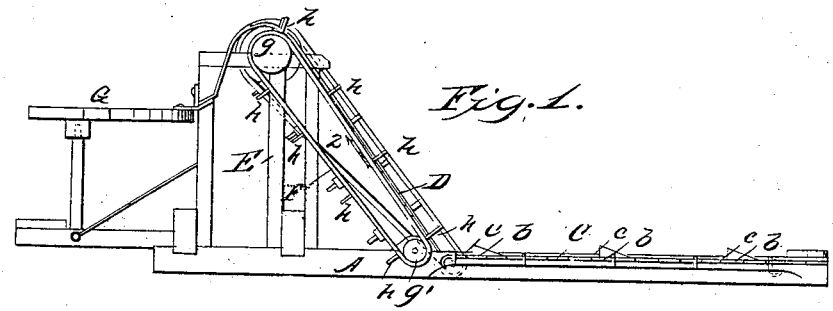
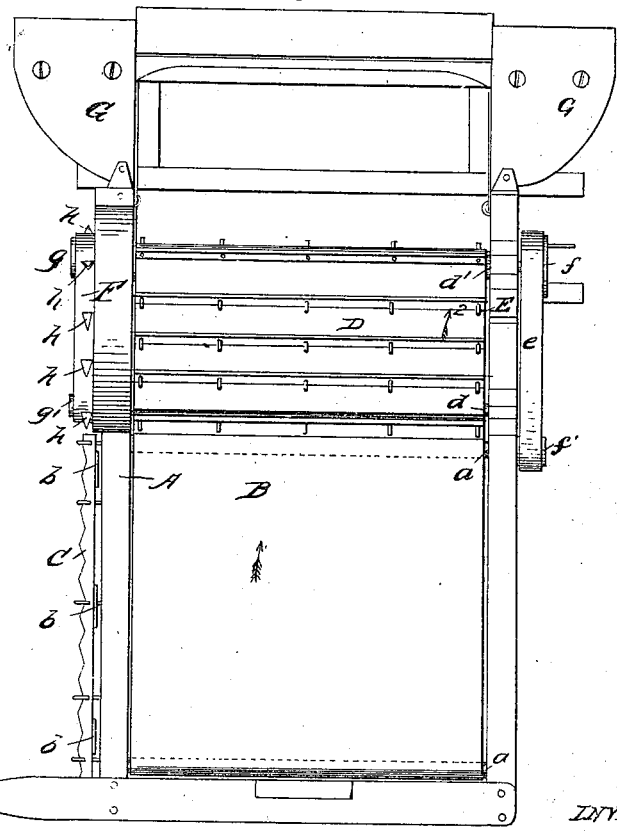

UNITED STATES PATENT OFFICE.

C. W. MARSH AND W. W. MARSH, OF SHABBONA, ILLINOIS.

IMPROVEMENT IN RAKING DEVICES FOR HARVESTERS.

Specification forming part of Letters Patent No. 41,080, dated January 5, 1864.

*To all whom it may concern:*

Be it known that we, C. W. MARSH and W. W. MARSH, of Shabbona, in the county of De Kalb and State of Illinois, have invented a new and Improved Raking Device for Harvesters; and we do hereby declare that the following is a full, clear, and exact description of the same, reference being had to the accompanying drawings, making a part of this specification, in which—

Figure 1 is a front view of the frame of a harvester having our invention applied to it; Fig. 2, a plan or top view of the same.

Similar letters of reference indicate corresponding parts in the two figures.

To enable those skilled in the art to fully understand and construct our invention, we will proceed to describe it.

A represents a horizontal rectangular frame, in which a horizontal band, B, is placed, and fitted over rollers $a\ a$. This band B extends the whole width of the frame A, and moves in the direction indicated by the arrow 1.

C represents the sickle, which may be of the ordinary reciprocating kind, and works at the front of the frame A. This sickle has a series of upright ribs or projections, $b$, attached to its back part, the upper edges of said ribs or projections being inclined, so as to leave a vertical face, $c$, at one end, as shown clearly in Fig. 1, the upper edges of the ribs extending at one end down to the sickle C.

D represents an endless toothed apron, or it may be termed an "endless band of rakes." This toothed apron has an inclined position, and it works over rollers $d\ d'$, one of which, $d$, has its bearings in the frame A, and the other, $d'$, its bearings in an upright frame, E, attached to the frame A. The toothed apron D moves in the direction indicated by the arrow 2, and the apron D and band B are moved by power applied to the upper roller, $a'$, of the apron D, motion being communicated from the roller $d'$ to one of the rollers $a$ of the apron by a belt, $e$. The pulleys $f\ f'$, over which the belt $e$ passes, are of different diameters, the pulley $f$ of the roller $d'$ being of larger diameter than the pulley $f'$ of the roller $a$. Hence it will be seen that the band B will move quicker than the toothed apron D.

F is a belt, which passes around pulleys $g\ g'$ at the ends of the rollers $d'\ a$, which are opposite to the ends on which the pulleys $f\ f'$ are placed. This belt F is provided with teeth $h$ at suitable and equal distances apart.

The operation is as follows: As the harvester is drawn along the grain is cut by the sickle C and falls upon the band B the butts of course being at the front part of the band B. The band B, by its movement, conveys the cut grain to the toothed apron D; but the grain will not fall evenly, so that the straws will be perfectly parallel with each other on the band B. It will fall more or less obliquely, according to the position in which it may stand when cut. The grain or straw is brought at right angles with the band B by two different means, one being the ribs or projections $b$, which, as the sickle C moves in the direction indicated by arrow 1, catch the straw and shove it forward in the direction the band B is moving, and, during the return movement of the sickle, slip under the straw and catch it again at their vertical faces or sides $c$, when the movement of the sickle changes. The other means for straightening the grain or bringing the straw parallel consists in the difference of speed between the band B and the toothed apron D. In consequence of the former having rather a quicker movement than the latter, the grain will be straightened or brought at right angles to the band B at the lower part of the toothed apron D, so that the grain will ascend or be carried up by the toothed apron D in a horizontal position. While the grain is being carried up by the toothed apron D the toothed belt F holds the butts of the stalks, preventing them from lagging or falling. Thus it will be seen that the grain will be discharged from the upper end of the toothed apron D with the straws all parallel with the latter, and the grain consequently can be taken from the box or receptacle into which it is discharged from D in an even state, so that it may be bound with facility.

G G are the binders' tables, secured to the frame A.

The receptacle into which the grain is discharged (not represented) may be just below the upper part of the toothed apron D.

Having thus described our invention, what we claim as new, and desire to secure by Letters Patent, is—

1. Providing the sickle C with ribs or projections *b* when the latter are used in combination with the endless band B and toothed apron D, for the purpose specified.

2. The toothed belt F, in combination with the toothed apron D and endless band B, as and for the purpose set forth.

C. W. MARSH.
W. W. MARSH.

Witnesses:
SAMUEL MARSH,
OCTAVIUS KNIGHT.